United States Patent [19]

Collins

[11] 4,269,288

[45] May 26, 1981

[54] TRAIN DERAIL EMERGENCY BRAKE SYSTEM

[76] Inventor: Joseph A. Collins, 502 Middle St., Pittsburgh, Pa. 15227

[21] Appl. No.: 38,017

[22] Filed: May 11, 1979

[51] Int. Cl.$^3$ ............................................. B61H 13/00
[52] U.S. Cl. ...................................... 188/33; 105/216; 188/34; 188/151 A; 293/5
[58] Field of Search ........... 188/33, 34, 151 A, 153 R; 293/5, 6; 105/216, 217

[56] References Cited

U.S. PATENT DOCUMENTS

| | | | |
|---|---|---|---|
| 669,781 | 3/1901 | Giles | 105/216 |
| 780,214 | 1/1905 | Monnier | 188/153 R |
| 895,937 | 8/1908 | Andrew | 105/216 |
| 1,035,621 | 8/1912 | Martin | 293/5 |
| 1,077,217 | 10/1913 | Brunswick | 293/5 |
| 2,214,465 | 9/1940 | Kaufman | 293/5 |
| 3,881,672 | 5/1975 | Gittard | 105/217 X |

FOREIGN PATENT DOCUMENTS

| | | | |
|---|---|---|---|
| 833339 | 3/1952 | Fed. Rep. of Germany | 188/33 |
| 1004504 | 3/1957 | Fed. Rep. of Germany | 188/151 A |

*Primary Examiner*—George E. A. Halvosa
*Attorney, Agent, or Firm*—Carothers and Carothers

[57] ABSTRACT

Downwardly depending contact members are secured to the undercarriage of railroad cars and positioned inboard from the wheels of the cars and also positioned above the level at which the wheels contact the underlying tracks. These contact members are upwardly displaceable when the train derails upon contact with a rail or ground debris to release fluid pressure in the train brake system and thereby activate the brakes of all of the cars.

15 Claims, 2 Drawing Figures

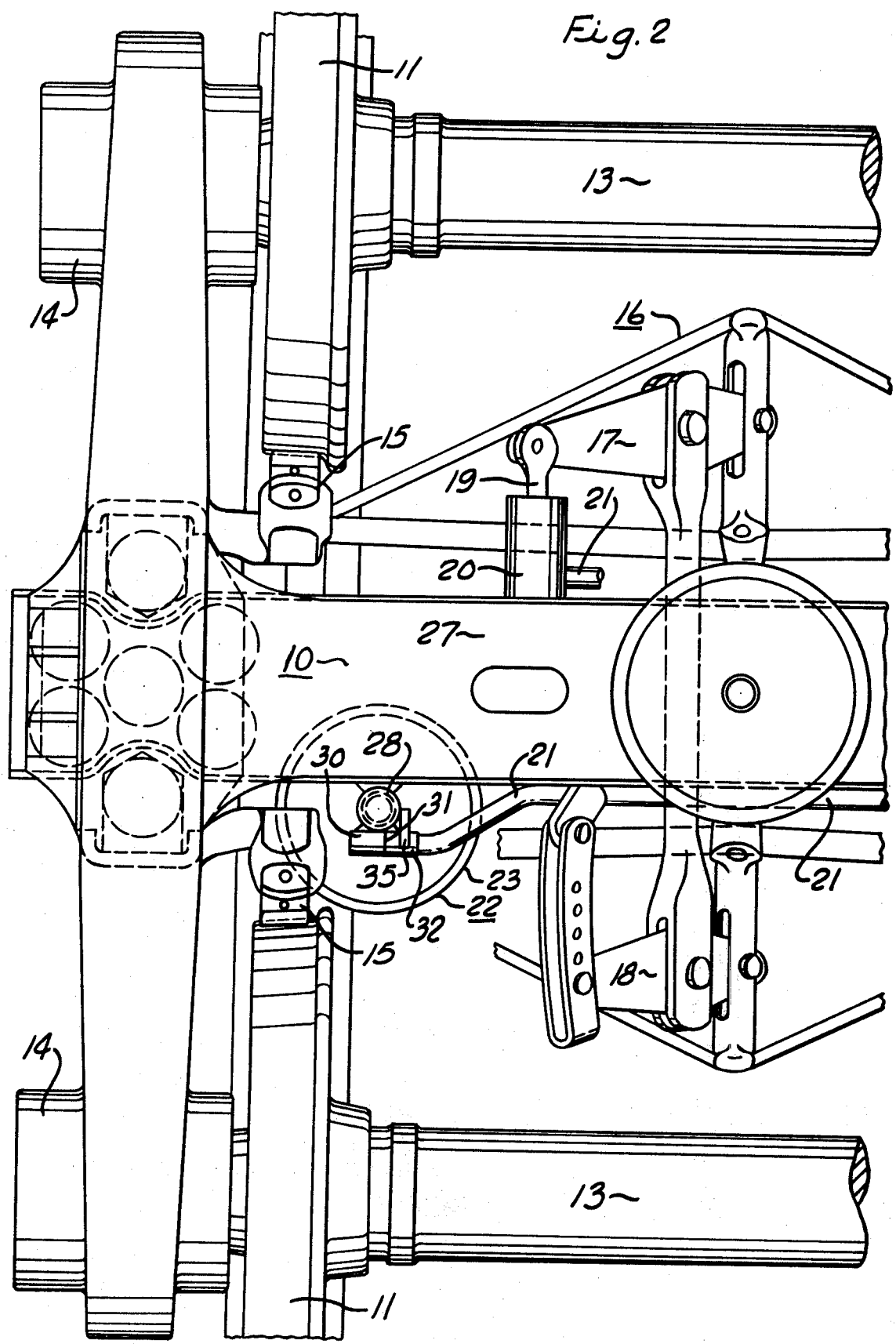

TRAIN DERAIL EMERGENCY BRAKE SYSTEM

BACKGROUND OF THE INVENTION

This invention relates generally to emergency brake systems and more particularly to means for automatically braking a train upon derailment.

Prior to the teachings of the present invention, no effective system existed for automatically braking a railroad train upon derailment of one or more of the railroad cars. It often occurs on long trains that one or more of the railroad cars may derail, yet the engineer is not aware of the situation until the damage created by the derailment has become excessive. It is very common for one or more cars to derail yet the locomotive will drag the derailed cars without the knowledge of the engineer with the subsequent result that many more of the other cars in the train also become derailed and even uncoupled so that very extensive damage is created to surrounding property by runaway cars and to many of the railroad cars themselves as well as the railroad tracks and bed.

It is a principal object of the present invention to provide a braking system which will quickly and automatically activate the train brakes upon derailment of the first car to thereby bring the train to an efficient and safe stop before extensive damage is done to life and property.

Systems do presently exist for railroad trains to activate the train brake system should the train inadvertently pass a red light or a switch which it should not have passed and could thereby cause danger of possible collision with other trains. These mechanisms generally consist of some type of mechanical element which is raised or engaged at the side of the railroad bed when this dangerous situation exists to engage a contact on the train or locomotive which will activate the emergency brake system. However, such emergency brake systems are not applicable to train derailment situations. For years, the railroad industry has been searching for an effective derailment emergency brake system. In this search, very complicated systems have been devised which work on electrical or electronic principles, yet they have been found to be extremely expensive and not practical or fully reliable.

SUMMARY OF THE INVENTION

The derail emergency brake system of the present invention is adapted to be applied to the undercarriage of the railroad cars which carries or supports the wheels of the cars which, in turn, ride on the underlying rails. In all conventional railroad trains, an emergency brake system is already provided which is activated when fluid pressure in a brake activating fluid supply conduit attached to the wheel brakes on the cars is released. In the derailment emergency brake system of the present invention, a derail emergency brake switch mechanism is secured to the undercarriage of the cars and it is positioned inboard from the car wheels. This switch mechanism is provided with a downwardly depending contact member positioned higher than the level at which the car wheels are in rolling contact with the track. This contact member is adapted to be upwardly displaceable upon contact with a rail or ground debris upon derailment of the railroad car to thereby release fluid pressure from the brake conduit which is otherwise conventionally provided on the train to activate the train wheel brakes.

Most railroad cars are provided with an undercarriage consisting of two trucks with a set of four wheels carried by each truck. Generally, the brake switch mechanism of the present invention will be provided in pairs, with one pair on each truck and positioned on opposite sides of the truck so that if the train derails to either side of the track, the derailment will be quickly detected.

The derail emergency brake switch mechanism of the present invention is further positioned inboard from the wheels on the truck only a sufficient amount such that if the wheels derail to the outside, the contact member will engage that rail for upward displacement of the downwardly depending contact member. Generally, this contact member might typically be positioned, for example, at about eleven inches from the positions where the brake riggings on the trucks attach to the truck frame.

The contact member should generally extend no lower than approximately the lowest extending portion of the truck frame in order to avoid accidental actuation of the mechanism.

The brake switch mechanism may include any type of suitable switch mechanism which would exhaust the pressure from the conduit feeding the brakes of the respective railroad cars. In one example, it might be a breakaway coupling, similar to the type of coupling utilized to couple the conduit between railroad cars for the brake system, which breakaway coupling communicates with this conduit and is adapted to uncouple when the contact member is upwardly displaced to thereby release pressure in the conduit.

It is preferable that the contact member have a contact foot which is a disc plate having a downwardly facing convex surface. Such a configuration assures that when the contact member engages the underlying railroad tracks or debris it will not snag, but will rather ride over the debris or rail freely and at the same time be displaced upwardly to activate the emergency brake mechanism.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

FIG. 2 is a top view of the structure illustrated in FIG. 1.

DETAILED DISCUSSION OF THE PREFERRED EMBODIMENT

Figure 1:
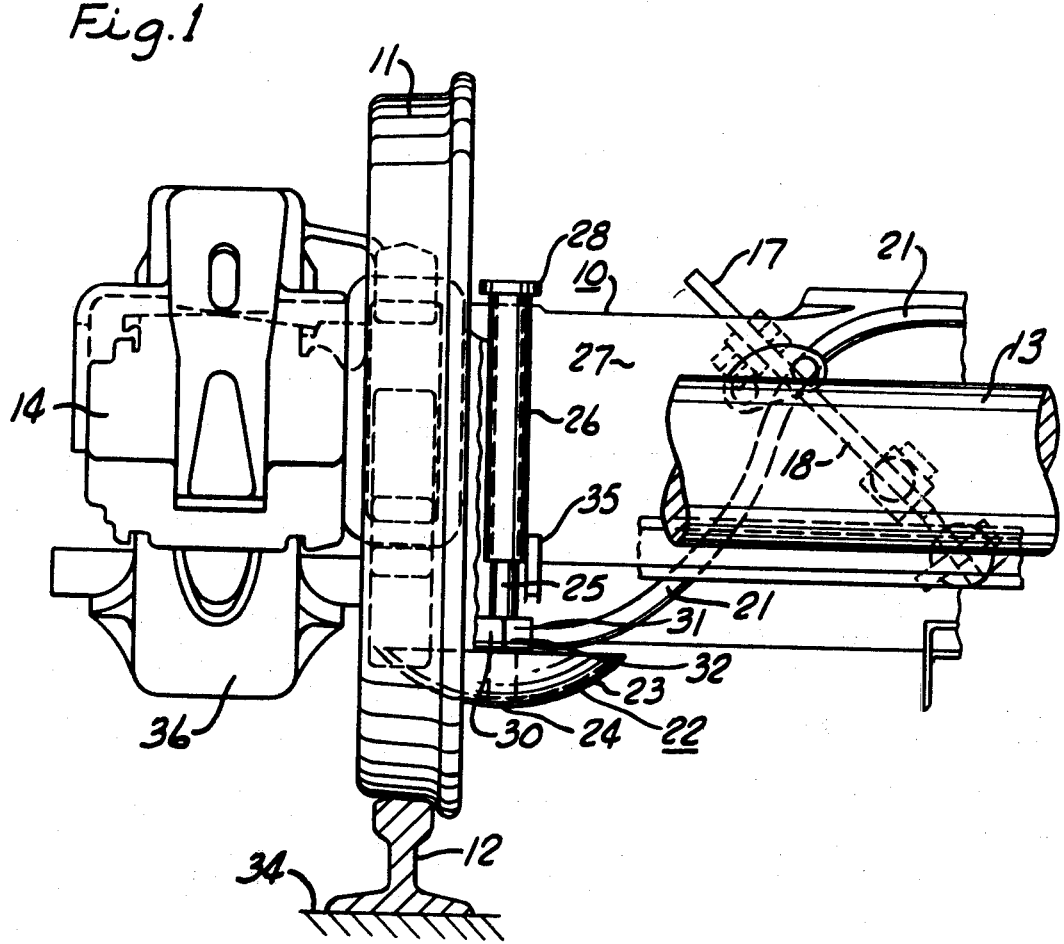
FIG. 1 is a view in front elevation of an end portion of a railroad car truck with portions removed and the derail emergency brake switch mechanism of the present invention is secured to the truck frame.

Referring to the drawings, the railroad truck 10 is a conventional undercarriage for a railroad car (not shown) and in typical fashion carries the wheels 11 which ride on underlying railroad track 12. Wheels 11 are rigidly secured with their corresponding axles 13 and are also journaled for rotation in bearing boxes 14 in typical fashion.

Brakes 15 are shown in braking engagement with wheels 11. Brakes 15 are normally in braking engagement with wheels 11 unless the brake system is pressurized as will be described hereinafter. This brake mechanism is very typically used at the present time in the industry and consists generally of brake rigging 16 which includes live lever 17 and dead lever 18. Live lever 17 is, in turn, connected to piston arm 19, which in turn is received in air cylinder 20. When air cylinder 20 is pressurized with air, live lever 17 is pivoted to manipulate the brake rigging 16 and to thereby release brakes 15 as long as cylinder 20 is pressurized.

As previously stated, this is a conventional braking system for railroad cars, and cylinder 20 is supplied with air under pressure through conduit 21. This conduit 21 travels the entire length of the railroad train with couplings between each railroad car in the conventional manner. Thus, in an emergency situation wherein the railroad engineer must brake the entire train, he will activate a mechanism in the locomotive which will release the air pressure within conduit 21, which will, in turn, depressurize air cylinder 20 and accordingly activate brakes 15.

Now turning to the derail emergency brake switch mechanism 22 of the present invention, it consists of a downwardly depending contact member 23 which is positioned higher than the level at which wheels 11 are in rolling contact with track 12. Contact member 23 generally consists of bottom contact plate 24 which is generally disc-shaped and has a downwardly facing convex surface so that should wheels 11 derail from rail 12, contact plate 24 will either engage rail 12 or other debris along the tracks without gouging into the ground or otherwise getting hung up. The bottom contact plate 24 is in turn rigidly secured to a vertical rod 25 which is slidably received within vertical guide tube 26. Guide tube 26 is, in turn, welded to center beam 27 of the truck 10. The top of rod 25 is provided with an end cap abutment 28 which acts as a stop against the top end of guide cylinder 26 to limit the downward displacement or movement of contact plate 24.

Also secured to rod 25 is the blind end 30 of breakaway coupling 31. This coupling is a conventional type coupling presently used to couple conduit 21 between the respective railroad cars. These present day couplings are quickly released automatically when the cars are uncoupled and pull apart. These conventional type couplings are such that if one were to pull upwardly on the coupling, it would uncouple. This coupling 31, however, does not have a passage all the way through, as the side or end of the coupling 30 which is secured to rod 25 is blind or has its passageway blocked off so that there will normally be no leakage of air pressure when the other side 32 of coupling 31 is secured therewith. This side 32 of the coupling is, in turn, connected directly to conduit 21, or rather another branch thereof. Nevertheless, this is the same conduit as previously mentioned which is in communication with conduit 21 attached to air cylinder 20.

Thus, should wheels 11 derail from rail 12, the track 12 or other debris and structure on the track bed 34 will be engaged by the contact plate 24 of the emergency brake switch mechanism 22, which thereby causes the contact member to be displaced upwardly by having rod 25 slide within guide cylinder 26. When this occurs, the right half 32 of coupling 31 will be struck or engaged by striker bar 35 thereby causing breakaway coupling 31 to immediately uncouple, which in turn, releases all the air pressure within conduit 21 and thereby also immediately brakes the entire train by releasing the air pressure in air cylinders 20 and causing all of the brakes 15 to activate, thereby stopping the train very quickly before any extensive damage is done due to the car derailment.

It should be noted that these contact members 22 are secured to the undercarriage inboard from wheels 11, thus nothing is protruding out to the side of the train which might cause a dangerous situation. In the drawings, only one derail emergency brake switch mechanism 22 is illustrated. However, it must be understood that generally there will be two such devices for each railroad undercarriage truck 10. Another one will be positioned on the other side of the truck in the same fashion so that should the car derail in either direction, the derailment will be quickly detected.

Contact plate 24 is positioned so that it is no lower than the lowest extending portions 36 of truck 10 to avoid accidental actuation of the mechanism 22.

It should be further realized that any suitable mechanism may be utilized in place of the breakaway coupling 31. For example, a valve mechanism may be supplied which opens when rod 25 is displaced upwardly to release all of the air pressure within conduit 21. An upwardly displaceable lever arm could also be substituted for the slide arrangement of rod 25 and sleeve 26.

I claim:

1. In a railroad car having an undercarriage with a plurality of wheels for rolling on a track and brakes for said wheels which are activated when fluid pressure in a brake activating fluid supply conduit attached to said brakes is released; a derail emergency brake switch mechanism secured to said undercarriage inboard from said wheels and having a downwardly depending contact member positioned sufficiently higher than the level at which said wheels are in rolling contact with the track to avoid accidental actuation of said mechanism when all wheels are railed, a breakaway coupling mounted on said undercarriage and connected to said fluid supply conduit, said breakaway coupling being adapted to uncouple and to remain open when initially actuated to completely exhaust fluid pressure in said fluid supply conduit, said contact member adapted to slidably contact with a rail or ground debris upon derailment of the car when moving in either a forward or reverse direction to thereby upwardly displace said contact member to uncouple said breakaway coupling and thereby release all fluid pressure from said conduit to activate said brakes.

2. The derail emergency brake switch mechanism of claim 1 including two such mechanisms secured in spaced relationship to said undercarriage inboard from said wheels but positioned on opposite sides of said car.

3. The derail emergency brake switch mechanism of claim 1 wherein said mechanism is positioned inboard from said wheels only a sufficient amount such that if said wheels derail to the outside said contact member will engage that rail for upward displacement of the member.

4. The derail emergency brake switch mechanism of claim 1 wherein said undercarriage includes a wheel truck frame carrying said wheels and said contact member extends no lower than approximately the lowest extending portions of said truck frame to avoid accidental actuation of said mechanism.

5. In a railroad car having an undercarriage with a plurality of wheels for rolling on a track and brakes for said wheels which are activated when fluid pressure in a brake activating fluid supply conduit attached to said brakes is released; a derail emergency brake switch mechanism secured to said undercarriage inboard from said wheels and having a downwardly depending contact member positioned higher than the level at which said wheels are in rolling contact with the track, a breakaway coupling mounted on said undercarriage and connected to said fluid supply conduit, said breakaway coupling being adapted to uncouple and to remain open when initially actuated to completely exhaust fluid pressure in said fluid supply conduit, said contact member adapted to be upwardly displaceable upon slidable contact with a rail or ground debris upon derailment of the car to uncouple said breakaway coupling and thereby release all fluid pressure from said conduit to activate said brakes, said mechanism includes a vertical guide tube secured to said undercarriage and a rod vertically slidable therein and a stop on said rod limiting the lowermost extension of said rod, said contact member secured to the bottom of said rod.

6. The derail emergency brake switch mechanism of claim 5 wherein said contact member is a disc plate having a downwardly facing convex surface.

7. The derail emergency brake switch mechanism of claim 5 wherein said breakaway coupling is positioned adjacent the bottom of said rod but above said contact member, said breakaway coupling adapted to uncouple when said contact member is upwardly displaced to release pressure in said conduit.

8. A derail emergency brake system for a train of wheel-supported and coupled railroad cars riding on a track comprising, fluid conduit means extending the length of said train and connected to braking mechanisms on said cars which are activated when fluid pressure in said conduit means is released to brake the car wheels, a plurality of downwardly depending contact members secured to the underside of said cars inboard from their wheels and positioned sufficiently above the level at which said wheels contact their underlying tracks to avoid accidental contact of said members with underlying objects when all wheels are railed, a plurality of breakaway couplings secured to the underside of said cars and positioned for actuation by said contact members respectively, said breakaway couplings being connected to said fluid conduit means and adapted to remain open when initially uncoupled to completely exhaust fluid pressure in said fluid conduit means, said contact members adapted to slidably contact with a rail or ground debris upon train derailment when moving in either a forward or reverse direction to thereby upwardly displace at least one of said contact members to uncouple an associated breakaway coupling and thereby release all fluid pressure from said conduit means to activate said brakes.

9. The derail emergency brake system of claim 8 wherein there are at least two of said contact members on each car positioned on opposite sides to detect derailment to either side of the tracks.

10. The derail emergency brake system of claim 9 wherein said contact members are positioned inboard from said wheels only a sufficient amount such that when wheels derail to the outside the adjacent inboard contact member will engage that rail for upward displacement of that member.

11. The derail emergency brake system of claim 10 wherein said cars have wheel truck frames carrying said wheels and said contact members extend no lower than approximately the lowest extending portions of said truck frames to avoid accidental actuation of said brake system.

12. The derail emergency brake system of claim 11 wherein a breakaway coupling is associated with each of said contact members and is adapted to uncouple when an associated one of said contact members is upwardly displaced to release pressure in said conduit means.

13. A derail emergency brake system for a train of wheel-supported and coupled railroad cars riding on a track comprising, fluid conduit means extending the length of said train and connected to braking mechanisms on said cars which are activated when fluid pressure in said conduit means is released to brake the car wheels, a plurality of downwardly depending contact members secured to the underside of said cars inboard from their wheels and positioned above the level at which said wheels contact their underlying tracks, a plurality of breakaway couplings secured to the underside of said cars and positioned for actuation by said contact members respectively, said breakaway couplings being connected to said fluid conduit means and adapted to remain open when initially uncoupled to completely exhaust fluid pressure in said fluid conduit means, said contact members being upwardly displaceable upon slidable contact with a rail or ground debris upon train derailment to uncouple said breakaway couplings and thereby release all fluid pressure from said conduit means to activate said brakes, wherein said contact members each include a vertical guide tube secured to said truck frame and a rod vertically slidable therein and a stop on said rod limiting the lowermost extension of said rod and a contact plate secured to the bottom of said rod.

14. The derail emergency brake system of claim 13 wherein said contact plate is disc-shaped with a downwardly facing convex surface.

15. The derail emergency brake system of claim 13 wherein each breakaway coupling is positioned adjacent the bottom of an associated rod but above said contact plate, said breakaway couplings being adapted to uncouple when said contact member is upwardly displaced to release pressure in said conduit.

* * * * *